Patented Feb. 7, 1928.

1,658,359

UNITED STATES PATENT OFFICE.

FRIEDRICH ERNST KARL STEPPES, OF HARBURG-ON-THE-ELBE, GERMANY, ASSIGNOR TO DR. HEINR. TRAUN & SÖHNE, VORMALS HARBURGER GUMMI-KAMM-COMPAGNIE, A SPECIAL PARTNERSHIP (KOMMANDITGESELLSCHAFT) CONSISTING OF HEINRICH OTTO TRAUN AND OSCAR TRAUN, OF HAMBURG, GERMANY.

CONDENSATION PRODUCTS OBTAINED FROM UREA AND SOLID POLYMERS OF FORMALDEHYDE AND PROCESS OF MAKING SUCH PRODUCTS.

No Drawing. Application filed August 19, 1926, Serial No. 130,342, and in Germany December 4, 1924.

My invention relates to the preparation of new and useful condensation products from urea and solid polymers of formaldehyde. It is well-known that condensation products can be obtained by the action of formaldehyde on urea. Scientific publications as well as patent specifications contain various disclosures or suggestions for the industrial utilization of such condensation products. The processes employed or proposed hitherto for this purpose are alike in this respect that they contemplate heating a more or less dilute aqueous solution of the components, with or without the addition of condensing agents, the treatment being generally conducted with countercurrent cooling, followed by a removal of the adhering water until the mass has acquired a sufficient consistency. Such removal is effected with the aid of outflow cooling, or a vacuum, etc. Masses produced in this manner are defective in that it is very hard to harden them, if made in relatively large bodies, and further, in that they will develop cracks readily after hardening, when they are subsequently worked or heated, or even simply left exposed to the air. All prior processes of this type known to me are subject to the difficulties which attend the removal of the water, both immediately after condensation and during the hardening; this has been discussed very clearly in an article on "Pollopas", by Dr. Pollack and Dr. Ripper, published in Nos. 98 and 100/101 of the Chemikerzeitung, 1924. I am also aware of the fact that polymeric formaldehyde has been used in preparing condensation products of urea.

My present invention is based on the discovery that by a certain novel treatment there may be produced, from solid polymers of formaldehyde, clear solutions of a concentration thought impossible. I have found that I can obtain from solid polymers of formaldehyde, with the addition of suitable neutral, acid, or alkaline (basic) substances, clear aqueous solutions containing up to 75% and over of solid matter (including urea), in other words, solutions which for each 75 parts (by weight) of solid bodies contain only 25 parts of water, or even less. I found further that with a solution of this very high concentration the formation, from urea and formaldehyde, of a condensation product suitable for various purposes could be effected by heating or boiling in an open vessel (that is, under atmospheric pressure) in a remarkably short time (about ten minutes). Moreover, this short treatment also proved sufficient for removing the water to such a degree that the mass became readily moldable and adapted for the subsequent hardening without any intermediate treatment. Thus my invention overcomes the previously existing difficulties as to the removal of water.

It will be apparent that the new process is far superior to the prior ones as to cost of operation, in view of the exceedingly short time required for the boiling and the fact that no special apparatus is required. The shortness of the reaction period or phase precludes the occurrence or development of undesirable secondary reactions impairing the quality of the final product, such as undoubtedly take place below the counter-current cooler etc. under the practice employed heretofore, where the very sensitive urea and formaldehyde were heated for hours. The improvement is shown by the uniform progress of the reaction, the very abundant yield (fully 90% of the raw materials employed) and the excellent quality of the mass produced, which even in large-sized pieces can be hardened without difficulty.

The finished product is a colorless mass of glass-like clearness, possessing practically absolute permanence under the influence of light (proof against fading or discoloration or clouding when exposed to light), and such hardness that articles of all kinds may be made from it by cutting, turning, milling, or like operations. The aforesaid mass refracts light in a manner similar to glass and may be used instead of glass for optical and other purposes and possesses the advantage over glass of being capable of being turned in a lathe, and harder to break and not splintering when broken. The mass in addition is capable of being colored in imitation of all precious stones, as well as beads, and ornamental articles of all kinds, as well as fancy goods, dishes, boxes etc. If the mass is colored with pigments or rendered opaque it may be used to advantage as a substitute for opal glass, porcelain, alabaster, wood, ebony, bone and other substances.

An example of the practical carrying out of my invention is as follows:

Take, for instance, 504 parts by weight, of 95% paraformaldehyde, 100 parts of 7% ammonia, and from 200 to 240 parts of water, heat the mixture until the solids have been dissolved, when the clear aqueous solution will contain more than 40% of paraformaldehyde, and then dissolve in this solution, 480 parts of urea. If required, the solution is then filtered. Thereupon the solution (with or without this preliminary filtration) is heated until it boils violently, in an open vessel and while stirring. The condensation reaction, which is thus brought about, is completed within about ten minutes. This may be recognized by taking a sample of the mass, which at the end of the reaction should be a thick liquid, but still susceptible of being poured for molding. The boiling operation having been stopped, the mass is poured into molds, and solidifies after a while. While the mass is still fluid, I may color it by means of soluble pigments or dyes, or mix it with insoluble pigments and/or fillers of any suitable character. The subsequent hardening is obtained by again heating the mass, the temperature remaining below 100° centigrade during this second heating.

The proportion of formaldehyde to urea may be varied, as may the amount of ammonia. Instead of ammonia, I may use other substances which facilitate, assist, or promote the solution of paraformaldehyde; among these substances I may name alkalies, amin bases, salts such as formates, acetates and sulfites, acids such as hydrochloric acid or aromatic sulfoacids (and salts of the latter) and the like. Proper precautions must be taken in choosing the proportions of those among these substances which, when certain amounts thereof are added, are liable to act as catalyzers to start the condensing reaction. Special care should be exercised to prevent the immediate occurrence of a reaction during the progress of the solution or thereafter. Such a premature reaction would produce an unstable mass (frequently of a cloudy china-like appearance), the formation of which is to be avoided sedulously in my process. Condensation should take place without using any catalyzer, and should not occur until the highly concentrated clear solution is subsequently boiled. The additional or auxiliary substances referred to above are intended to have no action beyond that of hastening or promoting solution; a criterion for this action is that the solution of the paraformaldehyde should occur even if no urea is added. This is a point of material difference between my process and certain others, and particularly the one disclosed in Letters Patent of the United States, No. 1,482,358, granted to Ellis, which does indeed employ solid polymers of formaldehyde, but does not dissolve the solids (if at all) until after the addition of urea and of a catalyzer which initiates the reaction at once; that is, in such prior process the solution of the solids occurs during the reaction and as a result thereof, but not before. By my present invention, I produce a clear very highly concentrated solution of the solid ingredients or components, which solution will not undergo any reaction spontaneously even if kept for a long time, and which requires boiling for about ten minutes to bring about the condensing reaction, which latter proceeds gently without any visible disturbance, and without the formation of any sediment, deposit, or clouding.

It will be understood that instead of paraformaldehyde I may employ other solid polymers of formaldehyde. This modification and others may be made without departing from the nature of my invention as defined in the appended claims.

I claim:

1. The process which consists in dissolving a solid polymer of formaldehyde in water, with the aid of a solution-promoting substance, in such a way as to obtain a clear aqueous solution containing more than 40% of such formaldehyde polymer, dissolving urea in said aqueous solution, boiling the resulting solution under atmospheric pressure until, by the formation of a condensation product of such urea and formaldehyde polymer, a thick liquid mass results, and hardening such mass by heating it to a temperature below 100° centigrade.

2. The process which consists in making an aqueous solution of more than 40 per cent concentration of a solid polymer of formaldehyde in the presence of a solution-promoting substance, dissolving urea in the said aqueous solution, heating the resulting solution to form a condensation product of such urea and formaldehyde polymer, and solidifying such product.

3. The process which consists in making a solution of more than 40 per cent concentration of a solid polymer of formaldehyde, dissolving urea in said concentrated solution, and heating the resulting solution to form a condensation product of such urea and formaldehyde polymer.

4. As an intermediate product suitable for the manufacture of condensation products of urea and formaldehyde, a concentrated aqueous solution of a solid polymer of formaldehyde, said solution containing more than 40 per cent concentration of said polymer.

5. A condensation product of urea and solid polymeric formaldehyde which product is a hard body colorless, of glasslike clearness and proof against the action of light and has been produced by dissolving a solid polymer of formaldehyde in water with the aid of a solution-promoting substance, in such a way as to obtain a clear, aqueous solution containing more than 40% of such formaldehyde polymer, dissolving urea in said aqueous solution, boiling the resulting solution under atmospheric pressure until, by the formation of a condensation product of such urea and formaldehyde polymer, a thick liquid mass results, and hardening such mass by heating it at a temperature below 100° centigrade.

FRIEDRICH ERNST KARL STEPPES.